M. STOFFEL.
INSECT TRAP.
APPLICATION FILED JUNE 27, 1917.

1,255,485.

Patented Feb. 5, 1918.

UNITED STATES PATENT OFFICE.

MARTIN STOFFEL, OF INGLESIDE, ILLINOIS.

INSECT-TRAP.

1,255,485.   Specification of Letters Patent.   Patented Feb. 5, 1918.

Application filed June 27, 1917. Serial No. 177,250.

*To all whom it may concern:*

Be it known that I, MARTIN STOFFEL, a citizen of the United States, and a resident of Ingleside, county of Lake, and State of Illinois, have invented certain new and useful Improvements in Insect-Traps, of which the following is a specification.

My invention relates to improvements in "insect traps" and has special reference to the construction of an insect trap that is formed of two separate hemispherical members and provided with a plurality of entrance "cones" to facilitate the trapping of the insects alighting upon the outside of the trap. A special object of my invention is the provision of a structure largely made of reticulated metal, wire gauze, or other suitable fabric, and having a base or bottom which gives the structure its peculiar characteristics and also serves to greatly strengthen and increase the durability of the structure when formed. One of the objects of my invention is to provide a fly trap that has a plurality of ports through which flies and other insects may enter and be trapped. Another object of my invention is the provision of an insect trap that has the ports through which the flies enter, arranged in a manner so that the flies and other insects will have ready access thereto and be readily guided to the openings into the trap.

Other objects of my invention comprise the provision of an insect trap that is comparatively neat in appearance, easy to take apart and clean, efficient and dependable in its operation, and novel in its construction.

I prefer to accomplish the divers objects of my invention substantially in the manner hereinafter described and as more particularly pointed out in the appended claims. Reference will now be had to the accompanying drawings forming a part of this specification, in which,—

Figure 1:
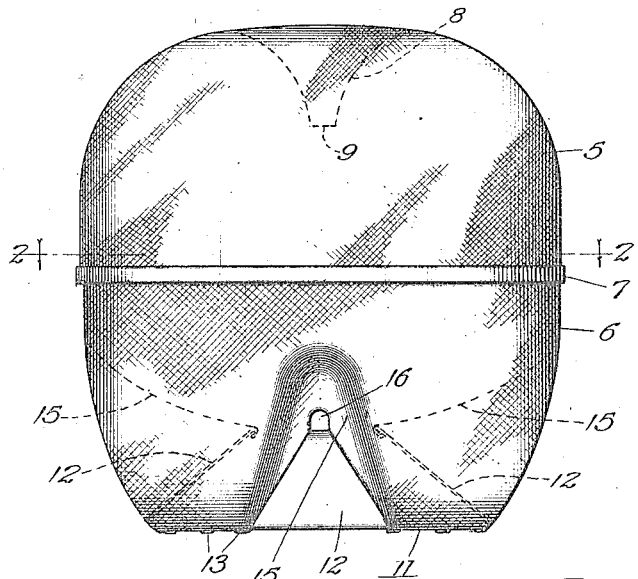
Figure 1 is a vertical side elevation of my improved insect trap.
Figure 2:
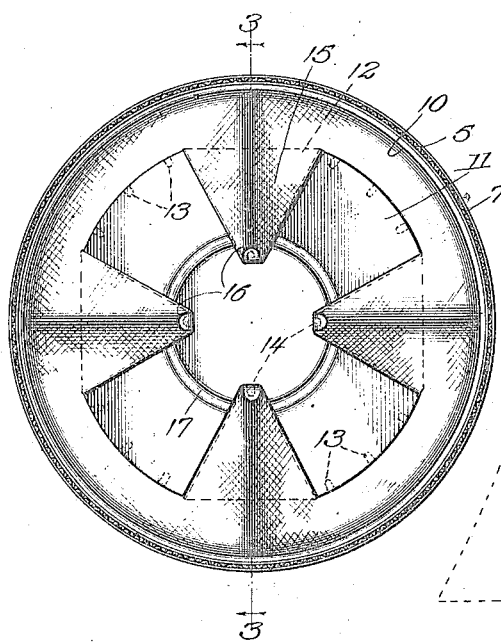
Fig. 2 is a transverse horizontal section thereof taken on line 2—2 of Fig. 1 and looking in the direction of the arrows.

Referring to the drawings, wherein similar reference characters have been employed to designate the same parts throughout the figures, it will be observed my insect trap preferably comprises two hollow hemispherical members or shells 5 and 6, the lower section 6 providing the base and the upper section 5 providing a dome for closing the same. The upper section is made hemispherical or semiglobular in shape, as shown, and is constructed of a suitable reticulated fabric, such as wire fabric of small mesh, the lower edge of the mesh being finished off or seamed with an annular piece of tin or other metal 7. This annular seam is of substantially U-shape in cross-section, and the edge of the wire mesh fits between the parallel members of this seam and is clamped thereto in any suitable manner. The upper portion of the dome section 5 is forced or bent downwardly and inwardly to form a conical entrance "cone" 8, that terminates in a small opening 9, through which the flies and other insects may enter to the interior of the chamber, but which, owing to its peculiar construction, prevents the egress of the insects after once entering the chamber.

The base section 6 is of substantially the same shape as the dome section just described, the upper edge of the wire mesh being seamed with an annular metal ring 10, of substantially U-shaped cross-section, in the same manner as the dome section is finished.

Figure 3:
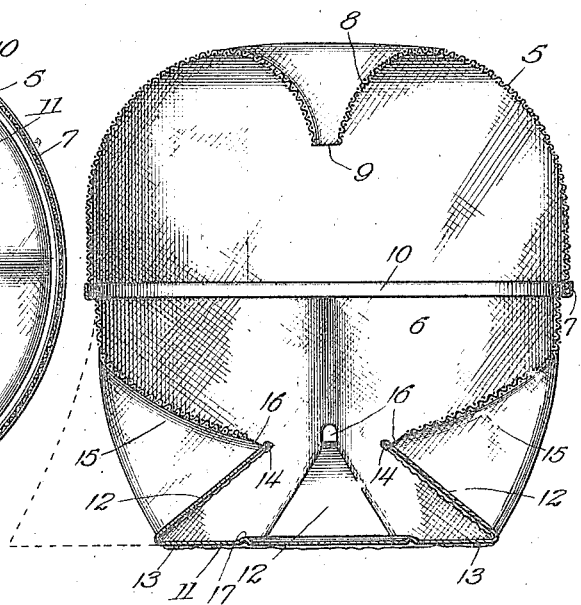
Fig. 3 is a vertical axial section of my invention taken on line 3—3 of Fig. 2.

The lower portion of the base section 6 is preferably flattened by providing a baseplate 11, of tin or other suitable metal, that is preferably stamped out in a blank of substantially rectangular or square outline, that is, it has preferably four lateral angular shaped extensions or corners 12. The lower edge of the base section 6 is preferably cut away in order to be fitted to the edge of this base-plate 11, and the wire mesh is secured to the edges of plate 11 by means of suitable tangs 13, that are formed with the plate 11, and after being inserted through the interstices of the wire mesh are bent back to clamp the latter securely thereto. The apexes of the angular extensions 12 are likewise provided with tangs 14, over which the lower edge of the wire mesh is stretched and secured thereby. After these extensions 12 are secured to the wire mesh, they are bent upwardly and inwardly, and then folded downwardly inside of the lower section 6, substantially as shown in Fig. 3 of the drawings, the wire mesh being thereby drawn inwardly to form suitable cones 15, and the angular extensions 12 provide suitably inclined floors or planes leading to the apexes of these cones. The mesh is spread apart slightly at the apexes of the cones 15 to provide entrance ports 16 through which the flies and other insects pass to reach the interior of the trap. If desired, however, the angular extensions 12 may be first bent to proper position and the wire mesh shaped to conform substantially thereto before securing the mesh to the base-plate.

In order to attract the flies and insects on the interior of the device above described, I have provided a small receptacle in the center of the base-plate 11 that is formed by stamping upwardly therein a shallow bead 17, of circular or other suitable outline, in order that sweetened water, syrup or other insect-attracting substance may be placed, and which is readily accessible for the purpose of cleaning when the dome section has been removed. It will be understood that one of the sections, preferably the base section 6, is slightly smaller in diameter than the inside diameter of the other or dome section 5, so that a snug fit of the two members is accomplished when the sections are placed in superimposed relation to each other. Cones 8 and 15, formed in the manner above described, preferably merge or gradually taper into the section of which they form a part, so that sharp angles or other obstructions are avoided and the flies and insects find an unobstructed path to the entrance ports 9 and 16, respectively, and, owing to this peculiar and novel construction of the entrance cones, I have found that the flies and insects will the more readily enter this trap than they will enter traps of other constructions, and for this reason I am enabled to construct the same of smaller dimensions, thereby saving a considerable portion of the cost in material.

While I have illustrated and described a specific form of my invention, it will be obvious that the shape and method of making the same may be modified without materially departing from the principles involved. For example, the dome member may be provided with more than one cone 8 and the base section may be constructed in the form of a triangular or any other number of points, without affecting the principles, and I therefore desire it understood that such refinements thereof are contemplated as included within the scope of my invention as expressed in the appended claims.

What I claim is:—

1. A fly trap comprising a compartment or chamber of spherical shape, formed of two hemispherical shells superimposed upon each other, one of said shells provided with a base-plate having angular extensions that are bent inwardly into said shell and the material forming said shell secured to the edges of said plate and said extensions and conforming to the contour thereof.

2. A fly trap comprising a dome shaped hollow shell of wire mesh, and a base section consisting of a shell of wire mesh having entrance cones extended into the interior thereof, and a base-plate to which the lower edges of said wire mesh are secured and which provides a support for said trap and is provided with inclined members leading to the apexes of said cones whereby one of the walls of said cones is formed.

3. A fly trap formed by securing a strip of wire mesh to a metal blank the latter being provided with angular extensions, said extensions adapted to be bent back into the interior of the chamber formed by said mesh and thereby form a plurality of entrance cones through which the insects have access to the interior of said trap.

Signed at Ingleside, county of Lake and State of Illinois, this 23rd day of June, 1917.

MARTIN STOFFEL.

Witnesses:
Wm. G. Nagle,
Wm. R. Caspers.

Copies of this patent may be obtained for five cents each, by addressing the "Commissioner of Patents. Washington, D. C."